United States Patent [19]
Cunningham et al.

[11] 4,403,131
[45] Sep. 6, 1983

[54] ELECTRICAL DISCHARGE MACHINING UTILIZING A COUNTER SLOT

[75] Inventors: George M. Cunningham, Horseheads; Peter J. Majestic, Corning, both of N.Y.

[73] Assignee: Corning Glass Works, Corning, N.Y.

[21] Appl. No.: 288,391

[22] Filed: Jul. 30, 1981

[51] Int. Cl.³ .............................................. B23P 1/08
[52] U.S. Cl. ............................. 219/69 W; 219/69 M; 219/69 D
[58] Field of Search ............... 219/69 M, 69 E, 69 D, 219/69 W, 69 R; 204/129.35, 129.5, 129.6

[56] References Cited

U.S. PATENT DOCUMENTS 2,526,423 10/1950 Rudorff .
4,205,213 5/1980 Inoue .
4,233,486 11/1980 Inoue .
4,324,970 4/1982 Nanasawa et al. ............... 219/69 W

FOREIGN PATENT DOCUMENTS 53-83192 7/1978 Japan ............................. 219/69 W
55-137835 10/1980 Japan ............................. 219/69 W Primary Examiner—M. H. Paschall
Attorney, Agent, or Firm—B. R. Turner

[57] ABSTRACT pg,1 A process of wire cutting electrical discharge machining is set forth including the steps of initially machining a counter slot to a depth greater than 0.03" in the surface of a workpiece having a width at least 1.5 times the width of a desired slot, machining the desired slot with dielectric fluid beginning at the bottom of the counter slot, utilizing the counter slot to facilitate the flushing out of such fluid, and removing the counter slot.

6 Claims, 3 Drawing Figures

ELECTRICAL DISCHARGE MACHINING UTILIZING A COUNTER SLOT

BACKGROUND OF THE INVENTION

Conventional electrical discharge machining (EDM) wire equipment comprises a head assembly mounted on a machine tool body and a numerically controlled positioning table. The wire equipment contains a spool assembly on which a fine wire is held taut between two spools. The drive spool moves the wire at a fixed rate from one spool to another with the useable work length between the two spools being about 4" to 8" depending on the work height to be cut. The cutting rate depends upon the wire size and the amperage carried by the wire, plus the feed rate set for the depth of the cut. Deionized water is normally used in the cutting zone as a dielectric, however, hydrocarbon oils can also be used. As with all EDM operations, the electrode, which in this case is in the form of a wire, produces an overcut such that an 0.008" diameter wire may produce an overcut of 0.001" per side and form a 0.010" slot.

In the extrusion forming of ceramic honeycomb structures used in catalytic converters for internal combustion engines, it is necessary to form extrusion dies with substantially long, thin slots which are not only straight and extend across the face of the die, but which also have parallel sidewalls, are burr-free, and have consistent surface finish. In addition, such long, thin slots should have a length greater than about $3\frac{1}{2}"$, a depth in excess of about 0.10" and a width spot greater than 0.012".

Known EDM wire processes, such as disclosed in U.S. Pat. Nos. 2,526,423; 4,205,213; and 4,233,486, are all capable of producing slots, however, most machine tools and their processes have a limited effective depth of slot which can be cut with a given wire diameter over a length of $4\frac{1}{2}"$ in the surface of a workpiece. That is, for example, the difficulty encountered with known EDM wire processes of flushing out the eroded particles from within small slots larger than 0.060" in depth during the cutting process, limits the effective depth of the cut. As the wire cutting process stalls due to a build-up of eroded particles, the slot width becomes materially enlarged or "overcut" as it is known at such depth, thus producing uneven slots and wire breakage.

The present invention overcomes the problems encountered with the known EDM wire processes of limiting slot depth of 0.060" and wire breakage, and permits the repeatable formation of a plurality of long, thin slots having parallel side walls with consistent surface finish and depths in excess of 0.060" and length of 8" or greater.

SUMMARY OF THE INVENTION

In its simplest form, the present invention relates to the utilization of an oversized pre-cut or counter slot formed in the surface of a workpiece so as to facilitate the formation of long thin slots within such workpiece by an EDM wire process. The utilization of the enlarged pre-cut or pilot counter slot in the surface of the workpiece functions to not only virtually double the length of cut obtainable with an EDM wire process, but also increases the efficiency of the cutting process. The counter slot permits co-axial flushing in such a manner to effectively flush the eroded particles from within the slot being cut.

DESCRIPTION OF THE PREFERRED EMBODIMENTS

Figure 1:
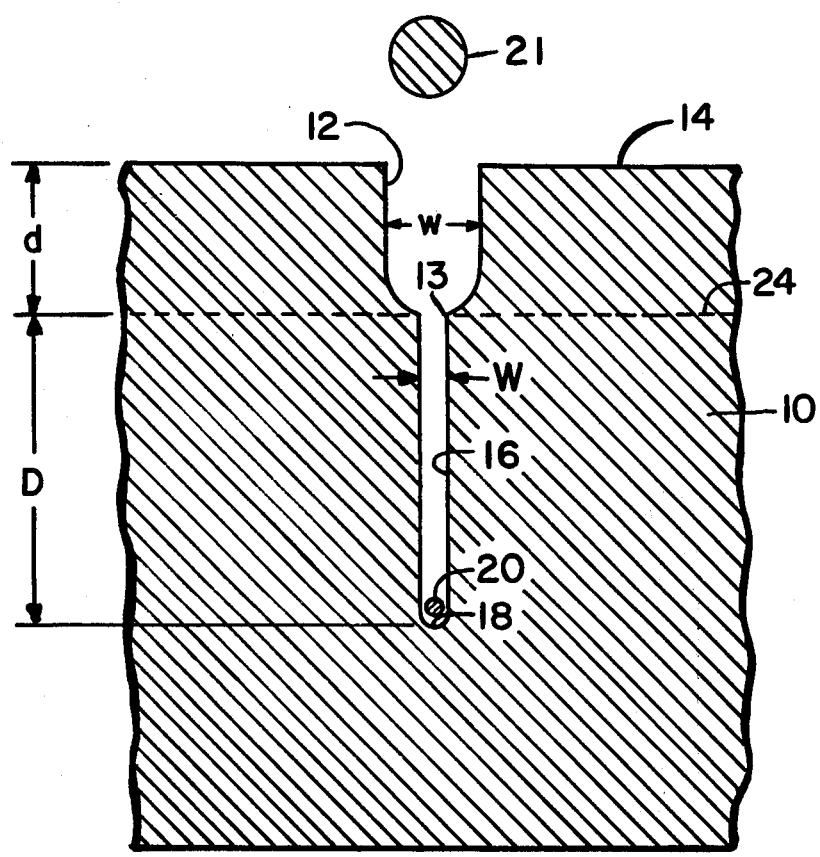
FIG. 1 is a greatly enlarged fragmental sectional view of a workpiece showing the present invention.

Referring now to the drawings, and particularly FIG. 1, a fragmental portion of a workpiece 10 is shown having an enlarged pre-cut or pilot counter slot 12 formed in a work surface 14 by EDM wire 21 and extending to a depth d. A long, thin slot 16 which has parallel sides of consistent surface finish extends into the workpiece 10 from an inner end 13 of the counter slot 12 a depth D. A wire 20 of an EDM wire machine is shown adjacent the inner end 18 of the slot 16. As noted in FIG. 1, the diameter of wire 21 and the width w of the counter slot 12 are substantially larger than the diameter of wire 20 and the width W of the long, thin slot 16, and the width w may be on the order of 2 to 3 times the width W of the long, thin slot. After the desired slots 16 are formed within the workpiece 10, the counter slots 12 may be eliminated by machining off the upper surface 14 of the workpiece 10 down to the bottom 13 of the counter slots 12 to form a new functional surface 24, that is, the depth d is removed.

Figure 2:
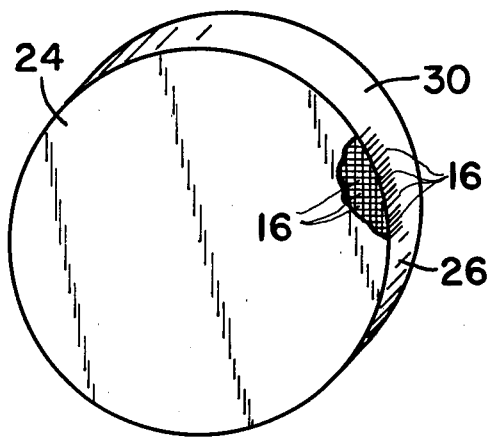
FIG. 2 is an oblique view of an extrusion die, with a fragmental portion thereof showing a pattern of discharge slots formed in the face thereof.

When the workpiece 10 is to be made into an extrusion die 30, as shown in FIG. 2, the new surface 24 becomes the functional discharge or outlet surface 24 of the extrusion die, and the plurality of long, thin slots 16 form a gridwork of such slots across the discharge face 24 of the die 30. As noted, the slots 16 extend into the side edge 26 of the die a distance equal to the depth D shown in FIG. 1.

Figure 3:
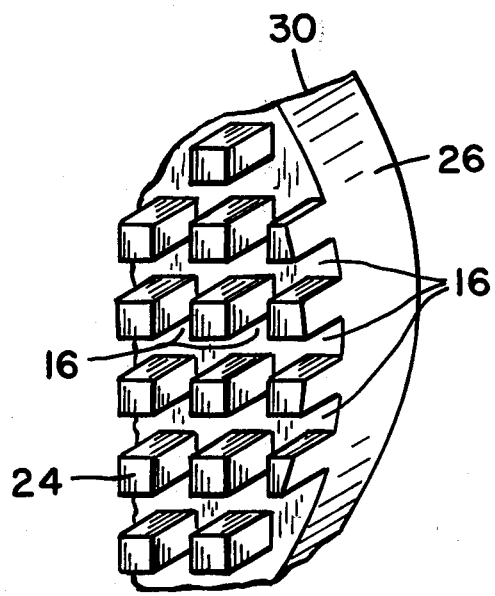
FIG. 3 is a greatly enlarged fragmental oblique view of a section of the die shown in FIG. 2, illustrating the slots formed therein utilizing the EDM wire process of the present invention.

Although only a fragmental portion 24 of the surface of die 30 is shown in FIG. 3, it will be apparent that the slots 16 extend across the full face 24 of the die 30 in a criss-cross fashion, and at the widest point extend across the full diameter of the die, which may be about 8" or more.

The basic EDM wire process is capable of machining slots with a width of about 0.01" and above, whereas the present invention enables the accurate and repeatable machining of long, thin, highly accurate slots having a width of less than 0.007" and a depth greater than 0.100". An enlarged pre-cut or pilot counter slot is initially formed in the surface of the workpiece with a width of about 1.5 to 3.5 times the desired slot widths to be formed in the workpiece. The depth of the counter slot may vary from about 0.05" to about 0.15" with an effective mean depth of about 0.085". In view of the time and cost element involved in forming an enlarged counter slot and the fact that deeper depths do not appear to produce increased cutting efficiencies in the desired slot, there appears to be no reason to provide a counter slot having a maximum depth greater than about 0.15".

When the depth of the counter slot is less than about 0.03", the standard deviation within the desired slot increases materially thus providing undesirable non-uniformity in parallelism and straightness of the cut slot.

For example, with a counter bore having a depth of about 0.15", it was found that the workpiece could be effectively penetrated to a mean depth of about 0.129" with a standard deviation of 0.00179", whereas in a similar test with a 0.03" depth counter bore, it was found that a mean depth of about 0.0124" could be obtained with a standard deviation of only 0.0052". Further, when utilizing a counter bore of only 0.03", the average cutting speed falls off significantly during the final 0.018" of penetration.

Although as previously mentioned, uncontrolled and irregular overcut is undesirable, such as occurs when the cutting becomes stalled due to ineffective flushing or removal of particles from the slot, it will be understood, however, that a uniform overcut is obtained during normal operation. That is, in a preferred embodiment, a 0.010" diameter brass wire is utilized to machine a pilot or counter slot 12 within the face 14, producing a mean width w of about 0.012". The slot 12 is machined to a depth d of about 0.085", and a long, thin working slot 16 is then machined with a 0.005" diameter molybdenum wire repeatably producing straight, burr-free, slots 16 with a mean width of about 0.0059" and a standard deviation of about 0.00018". The maximum length of the slot machined in the workpiece is equivalent to the maximum diameter of the extrusion die 30 to be formed therefrom and may be $6\frac{3}{4}$" to 8", depending on the desired die. Various materials which may be machined by such process are EZ-Cut 20, cold-rolled steel, D-2 steel, crucible CPM-10 V, Ferr-o-tic, stainless and high nickel alloys. However, the process is applicable to virtually all tool steels, carbide materials, hot ISO steels and vacuum melted steels.

Although the exact mechanism which allows the counter slot of the present invention to produce improved cutting efficiencies and improved standard deviations over known techniques has not been precisely determined, it is believed that the counter slot or enlarged pre-cut 12 functions as a turbulent flushing chamber for the dielectric fluid supplied to the cutting area during the EDM process, so as to facilitate the easy removal from the slot 16 by such fluid of the eroded particles within the slot produced during the cutting, which limit the effective depth and rate of cut if not so removed. The co-axial flushing is captured by the counter slot, thus enhancing effective flushing of eroded particles. Upon completion of the formation of the long, thin slots 16 forming the discharge slots of the die 30, the face 14 is machined away, removing the large counter slots 12 down to the functional die face 24.

Although the now preferred embodiments of the invention have been disclosed, it will be understood by those skilled in the art that the wire cutting process of the present invention may be utilized to form virtually any article desired, and that various changes and modifications may be made without departing from the spirit and scope of the invention as defined in the appended claims.

We claim:

1. A method of forming a slot in a workpiece utilizing a wire cutting electrical discharge machining process which comprises, initially cutting by wire electrical discharge machining a counter slot in the surface of an electrically conductive workpiece having a width at least 1.5 times the width of a desired slot to be formed in the said workpiece, machining said counter slot to a depth greater than about 0.030", wire electrical discharge machining a desired slot in said workpiece beginning at the bottom of said counter slot utilizing dielectric fluid, and utilizing said counter slot to facilitate the flushing out with said fluid of eroded particles from within said desired slot produced during the electrical discharge machining of the same so as to improve the obtainable cutting rate and depth of such slot.

2. A method of forming a slot in a workpiece as defined in claim 1 including the steps of initially cutting said counter slot in the surface of said workpiece with a first wire, electrical discharge machining the desired slot in said workpiece with a second wire, and selecting said first wire with a diameter of at least about twice the diameter of said second wire.

3. A method of forming a slot in a workpiece as defined in claim 1 including the step of machining said counter slot in the surface of said workpiece with a width of between about 1.5 and 3.5 times the width of the desired slot machined within said workpiece.

4. A method of forming a slot in a workpiece as defined in claim 1 including the step of wire electrical discharge machining said desired slot with a length greater than $3\frac{1}{2}$" and a depth of greater than 0.100".

5. A method of forming a slot in a workpiece as defined in claim 1 wherein the wire electrical discharge machining of said desired slot in said workpiece has a width less than 0.007".

6. A method of forming a slot in a workpiece utilizing a wire cutting electrical discharge machining process which comprises, initially cutting by wire electrical discharge machining a counter slot in the surface of an electrically conductive workpiece having a width at least 1.5 times the width of a desired slot to be formed in said workpiece, machining said counter slot to a depth greater than about 0.03", wire electrical discharge machining a desired slot in said workpiece beginning at the bottom of said counter slot utilizing dielectric fluid, utilizing said counter slot to facilitate the flushing out with said fluid of eroded particles from within said desired slot produced during the electrical discharge machining of the same so as to improve the obtainable cutting rate and depth of such slot, and removing the surface of said workpiece down to the bottom of said counter slot so as to form a new surface at the beginning of said desired slot.

* * * * *

UNITED STATES PATENT AND TRADEMARK OFFICE
CERTIFICATE OF CORRECTION

PATENT NO. : 4,403,131
DATED : September 6, 1983
INVENTOR(S) : George M. Cunningham & Peter J. Majestic It is certified that error appears in the above-identified patent and that said Letters Patent are hereby corrected as shown below:

Under ABSTRACT, before "A", cancel --pg. 1--.

Column 1, line 32, "spot" should be changed to --not--.

Column 1, line 64, "length" should be changed to --depth--.

Column 3, line 19, before "slot 12", insert --pilot--.

Column 4, line 45, before "said workpiece" insert --the--.

Signed and Sealed this

Fifteenth Day of November 1983

[SEAL]

Attest:

GERALD J. MOSSINGHOFF

Attesting Officer

Commissioner of Patents and Trademarks